United States Patent
Bronson

(10) Patent No.: US 6,384,863 B1
(45) Date of Patent: May 7, 2002

(54) ERGONOMICALLY DESIGNED DIGITAL CAMERA CAPABLE OF BEING HELD BY ONE HAND

(75) Inventor: Barry Bronson, Saratoga, CA (US)

(73) Assignee: Hewlett-Packard Company, Palo Alto, CA (US)

( * ) Notice: Subject to any disclaimer, the term of this patent is extended or adjusted under 35 U.S.C. 154(b) by 0 days.

(21) Appl. No.: 09/685,564

(22) Filed: Oct. 11, 2000

(51) Int. Cl.[7] .......................... H04N 5/225; H04N 9/04; G03B 17/00; G03B 17/02
(52) U.S. Cl. .................. 348/373; 348/208; 348/333.02; 348/372; 396/420; 396/424; 396/540
(58) Field of Search ................................ 348/208, 373, 348/372, 333.02; 396/420, 424, 540; D16/206, 239, 243

(56) References Cited

U.S. PATENT DOCUMENTS

| | | | |
|---|---|---|---|
| 4,417,788 A | * 11/1983 | Alvarez et al. | 359/556 |
| 4,740,804 A | * 4/1988 | Shands | 354/126 |
| 4,779,833 A | * 10/1988 | Fletcher et al. | 248/550 |
| 4,810,078 A | * 3/1989 | Armstrong | 354/219 |
| 5,065,249 A | * 11/1991 | Horn et al. | 352/243 |
| 5,155,512 A | * 10/1992 | Leonard | 354/82 |
| 5,305,030 A | * 4/1994 | Yokoyama et al. | 354/64 |
| 5,572,253 A | * 11/1996 | Ueda | 348/222 |
| 5,752,113 A | * 5/1998 | Borden | 396/428 |
| 5,761,550 A | * 6/1998 | Kancigor | 396/178 |
| 6,091,453 A | * 7/2000 | Coan et al. | 348/373 |
| 6,122,003 A | * 9/2000 | Anderson | 348/207 |
| 6,181,875 B1 | * 1/2001 | Hamada et al. | 348/208 |

* cited by examiner

Primary Examiner—Wendy R. Garber
Assistant Examiner—John M. Villecco

(57) ABSTRACT

An ergonomically designed digital camera includes a hand grip that can be comfortably held by one hand and a lens assembly that is positioned above and connected to the hand grip by a telescoping and rotating device. The hand grip has one or more buttons including a shutter trigger located on a front surface of the hand grip, and one or more command control buttons located on a back surface of the hand grip. The lens assembly includes a memory device that stores digital images or videos and a micro display viewfinder located on a back surface of the lens assembly. The lens assembly may also include a fill-in flash and/or a telescoping flash.

19 Claims, 4 Drawing Sheets

“NINTENDO” generation.
ERGONOMICALLY DESIGNED DIGITAL CAMERA CAPABLE OF BEING HELD BY ONE HAND

TECHNICAL FIELD

The technical field is ergonomically designed digital cameras.

BACKGROUND

Digital cameras are becoming increasingly popular, given today's fast growing computer technology. Among the many advantages, digital cameras can be made compact because they do not need film, and the digital images produced by digital cameras can be downloaded easily to a computer, printer or television, stored electronically, sent to the internet, and e-mailed to friends and family.

However, the digital cameras available in the market today are not designed to be comfortably held or operated. Normally, a person taking a picture has to hold the camera with both hands, and raise the entire camera to eye level.

Efforts have been made to make digital cameras smaller, lighter, or even resembling a remote control so that they can be operated by one hand. However, those efforts have not eased the discomfort of having to position the hand awkwardly in order to raise the camera to eye level.

Another problem associated with the traditional cameras and digital cameras is that in order to switch between a portrait and a landscape position, a user has to tilt the entire camera 90 degrees, putting the user's hands in an awkward and uncomfortable position.

Yet another problem associated with the traditional cameras and digital cameras is that the viewfinder found in most digital cameras normally has a low resolution display and drains much of the battery power.

Still another problem associated with the traditional cameras and digital cameras is that the built-in flash, typically positioned near the lens, can cause red-eye effect when it flashes.

SUMMARY

An ergonomically designed digital camera takes a big step forward from the traditional way that digital cameras are built. The camera enables a user to take pictures with the user's hands in a comfortable and natural position. The camera includes a hand grip that is designed to be comfortably held by one hand, and a lens assembly that is positioned above and may be connected to the hand grip by a telescoping and rotating device. The hand grip may include one or more buttons including a shutter trigger located on a front surface of the hand grip, and one or more command control buttons located on a back surface of the hand grip. The camera also includes a memory device, operatively connected to the lens, that stores digital images or videos. The ergonomically designed digital camera may further include a portrait/landscape rotate button that enables a user to rotate the lens or an image array between a portrait position and a landscape position by simply pushing the button. In addition, the camera may include a microdisplay viewfinder that offers a high resolution display and helps to conserve battery power. The camera may also include a telescoping flash that can be raised high above the lens to achieve red-eye reduction or other special effects.

DESCRIPTION OF THE DRAWINGS

The detailed description will refer to the following drawings in which like numerals refer to like items, and wherein.

DETAILED DESCRIPTION

Figure 1A:
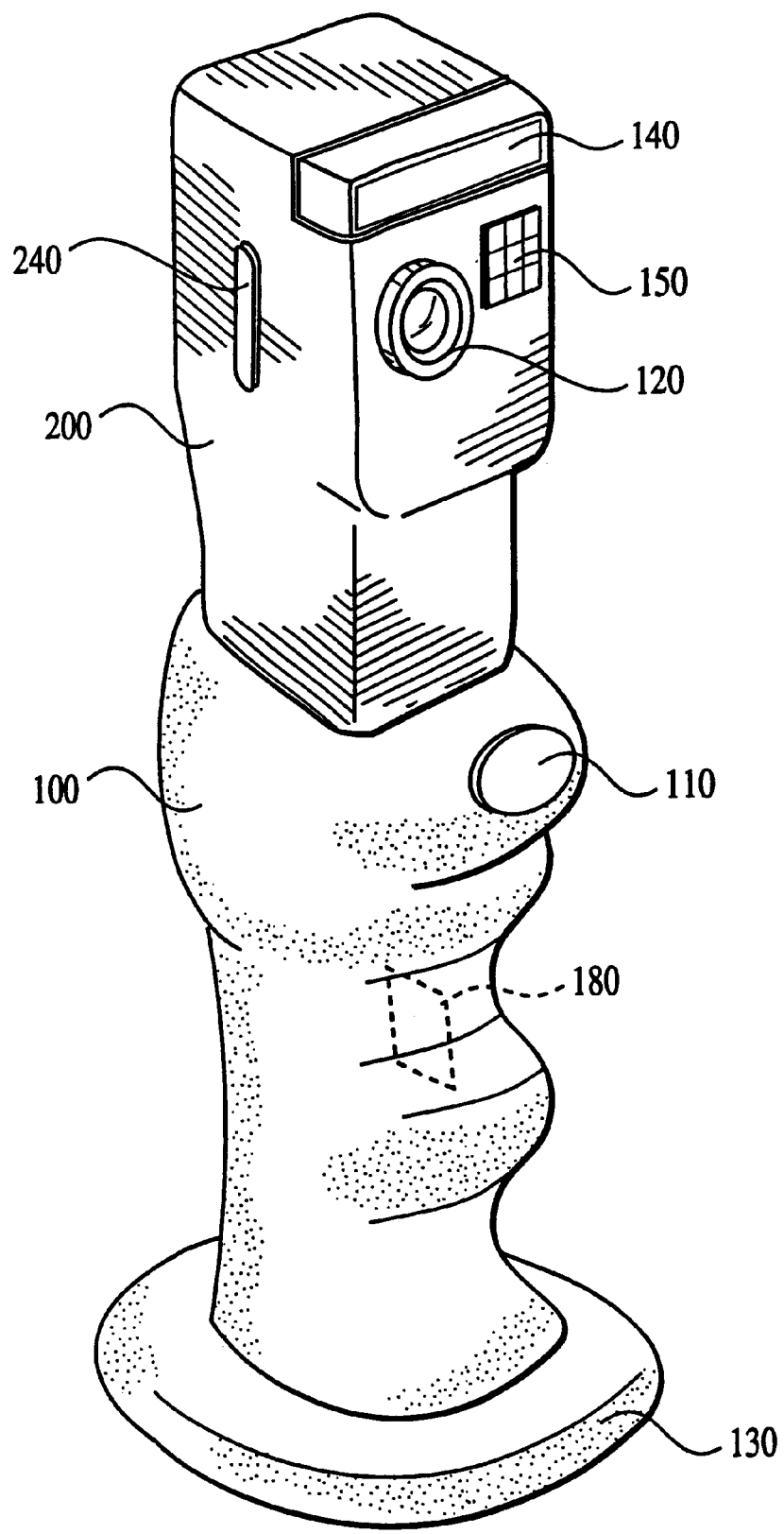
FIG. 1(a) is a front view of one embodiment of the ergonomically designed digital camera.

FIG. 1(a) is a front view of one embodiment of the ergonomically designed digital camera, which comprises two sections. A lower section of the digital camera includes a hand grip 100 capable of being comfortably held by either hand. The hand grip 100 may be designed to resemble a joy stick used for video games, thus especially appealing to the "NINTENDO" generation.

The hand grip 100 may include a shutter trigger 110 located on a front surface of the hand grip 100. The shutter trigger 110 may be designed and located to be depressed by an index finger on the hand holding the hand grip 100. The shutter trigger 110 may include multiple positions to lock in settings before snapping the pictures. The hand grip 100 may also include additional front surface buttons (not shown) for controlling additional features such as zoom in and zoom out. The zoom control buttons may be controlled by other non-thumb fingers and may control the rate of zoom based on how far the buttons are pushed. The zoom control buttons may alternatively be located on a back surface of the hand grip 100 and may be controlled by the thumb. The hand grip 100 may also include a flat base that enables the hand grip 100 to sit firmly on a flat surface. A battery compartment 130 may be located in the base portion of the hand grip 100. Any standard battery may be used to provide power to the ergonomically designed digital camera, examples being one or more standard AA batteries, lithium batteries or various rechargeable batteries. The battery compartment 130 may comprise a battery access (not shown) that provides access to the battery compartment 130.

An upper section of the digital camera, a lens assembly 200, is positioned above the hand grip 100 and connected to the hand grip 100 by a telescoping and rotating device 160. The telescoping and rotating device 160 is shown more clearly in FIG. 1(b) and will be described in detail later.

Figure 1B:
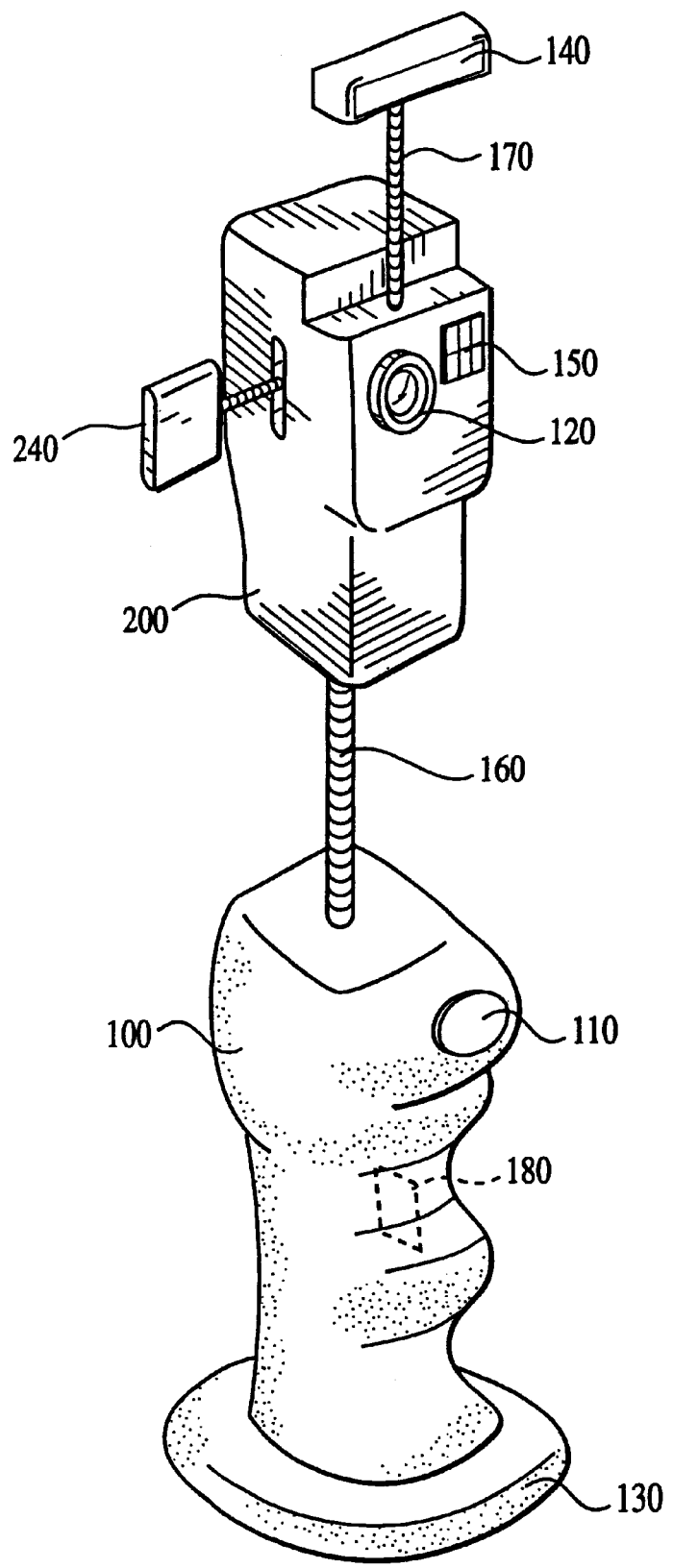
FIG. 1(b) is an other front view of the embodiment of the ergonomically designed digital camera.

The lens assembly 200 may comprise a lens 120 and a fill-in flash 150 both of which may be located on a front surface of the lens assembly 200. The lens 120 and the fill-in flash 150 may be similar to standard lenses and flashes commonly found on other digital cameras. The lens assembly 200 may also include a telescoping flash 140, which may be connected to the lens assembly 200 by a telescoping and rotating device 170. The telescoping and rotating device 170 may be similar to a telescoping antenna that can be extended and rotated freely. The telescoping and rotating device 170 may be designed to be pivotable and/or flexible, enabling the telescoping flash 140 to be bent in any direction that the user desires. The telescoping flash 140 may be raised high above eye level for red-eye reduction. The telescoping flash 140 may also be tilted vertically to achieve special effects, such as soft lighting, side-lighting for special shadow effects, etc. FIGS. 1(b) and 2(b) shows more clearly the telescoping flash 140 in an extended position. The fill-in flash 150 described earlier may be eliminated, switched of for to a reduced power level, given the more functional telescoping flash 140.

The ergonomically designed digital camera takes discrete still digital images, compresses and stores the digital data files representative of the se digital images in a memory device 180. Although described for still images, many of the benefits described also can apply to the capture of moving images (videos). The memory device 180 may be similar to a standard memory device found in other digital cameras. For example, the memory associated with the memory device 180 may be a semiconductor memory such as SRAM, RAM, hard disk, tape, or flash memory. Depending on the design preference, the memory device 180 may be located either in the hand grip 100 or in the lens assembly 200.

A device not shown in the Figures is a microprocessor for controlling the digital camera. The microprocessor may be similar to a standard digital camera microprocessor. The microprocessor may execute instructions to generate the mode menu, take pictures, store digital images or videos, etc, and may respond to command control buttons 210, which will be described later in detail, and the shutter trigger 110 to control the operation of the digital camera. These instructions may be stored in memory associated with the processor.

FIG. 1(*b*) is an other front view of the camera. The telescoping and rotating device 160 that connects the hand grip 100 and the lens assembly 200 is in an extended position. The telescoping and rotating device 160, like the telescoping and rotating device 170, may be similar to a telescoping antenna that can be extended and rotated freely. The telescoping and rotating device 160 may be designed to be pivotable and/or flexible, enabling the lens assembly 200 to be bent in any direction that the user desires. Accordingly, when taking a picture, a user may raise the lens assembly 200 to eye level while at the same time keeping the hand that is holding the hand grip 100 in a comfortable and natural position, for example, at elbow level. This feature greatly reduces the discomfort associated with having to position the hand awkwardly in order to raise the camera to eye level. Once adjusted, the telescoping and rotating device 160 may remain in position by friction or a manual securing device. The ergonomically designed digital camera may also include electronic image stabilization (not shown) to reduce images blur due to small motions of the camera.

FIG. 1(*b*) also gives a better illustration of the shutter trigger 110 and the battery compartment 130, which are described earlier.

Figure 2A:
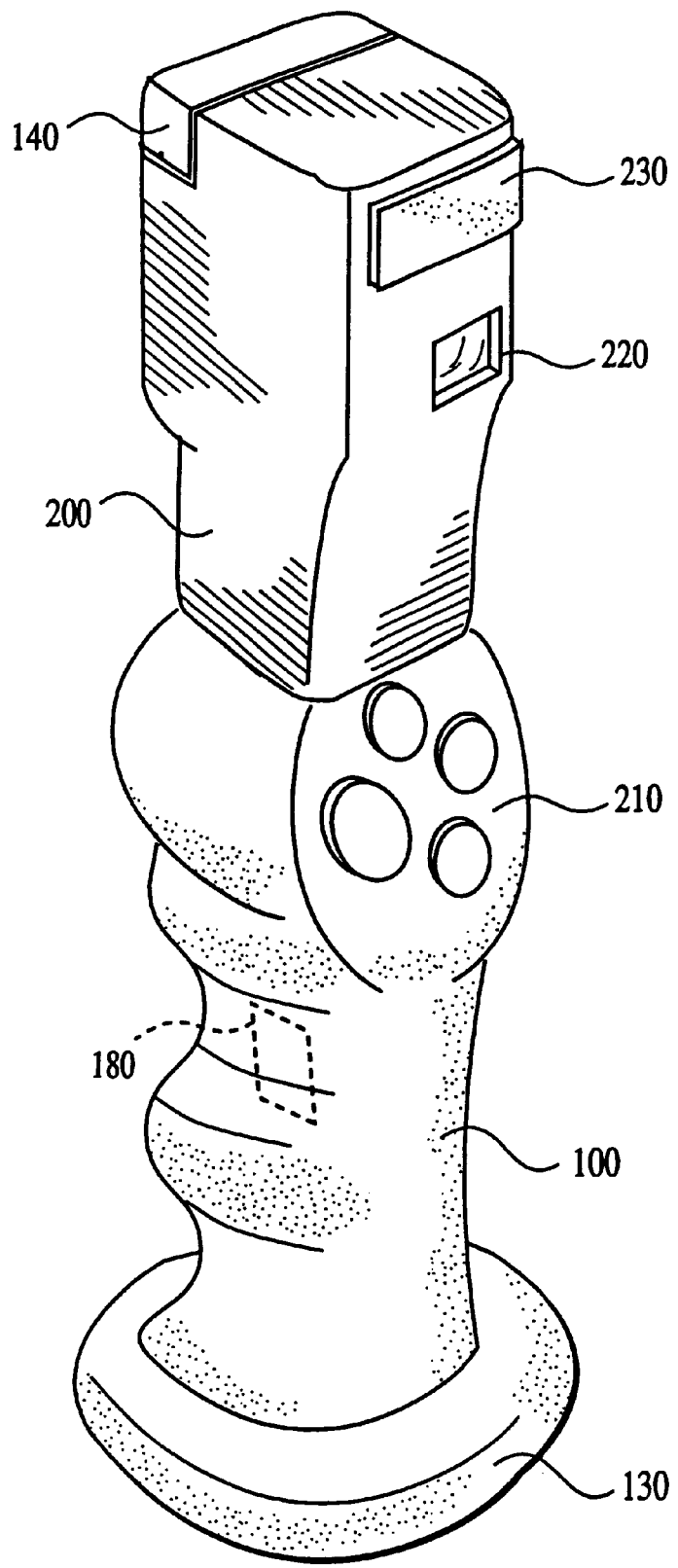
FIG. 2(a) is a back view of the embodiment of the ergonomically designed digital camera.
Figure 2B:
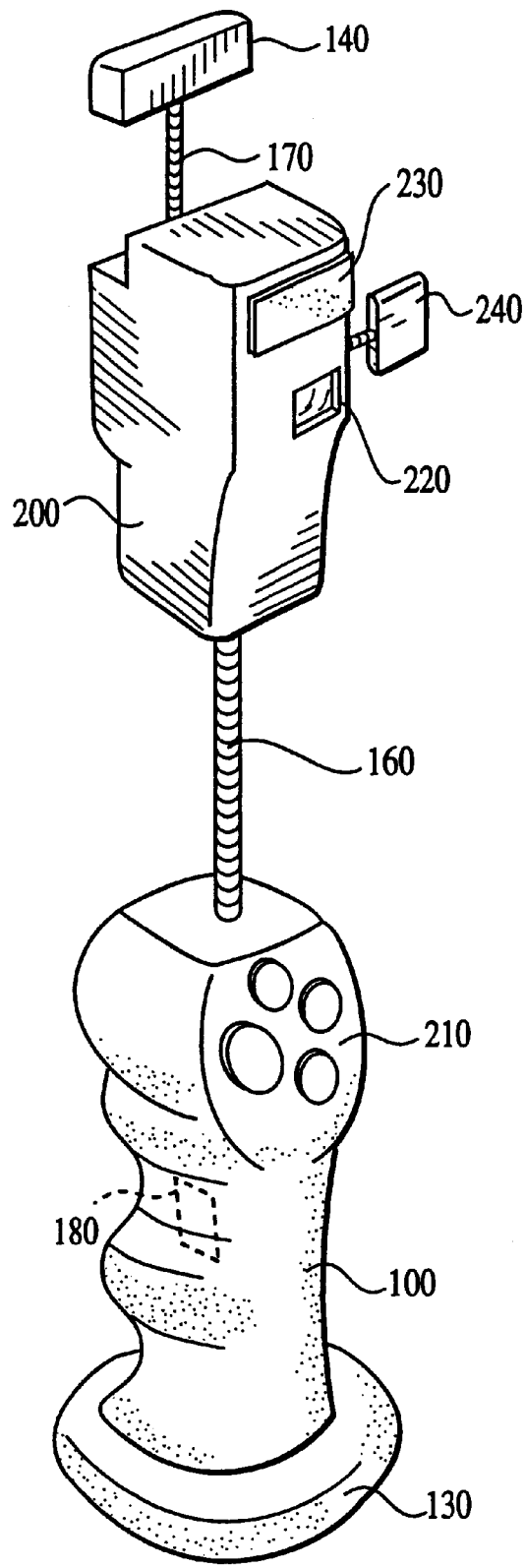
FIG. 2(b) is an other back view of the embodiment of the ergonomically designed digital camera.

FIG. 2(*a*) is a back view of the camera. One or more command control buttons 210 may be located on the upper back surface of the hand grip 100. The command control buttons 210 may be designed and located to be depressed by a thumb on the hand holding the hand grip 100. The command control buttons 210 may include control buttons normally found on other digital cameras, such as: zoom control buttons, a flash button, a delay timer button, an exposure offset button, a display previous picture(s) button, a display next picture(s) button, a delete last picture button, and a delete all pictures button. Alternatively, by utilizing a scrolling key and a select button, the command control buttons 210 may contain only one or two buttons to achieve the standard functions of a typical digital camera. The scrolling key and select button may be used to select features displayed on the microdisplay viewfinder 220, for example, in a mode menu, which will be described in detail later.

The command control buttons 210 may also include a portrait/landscape rotate button, so that a user can rotate the lens or an image array between a portrait position and a landscape position by simply pressing the button. The portrait position enables the taking of portrait type pictures, and the landscape position enables the taking of landscape type pictures. Alternatively, the switch between the portrait position and the landscape position may be achieved by rotating the lens assembly 200 manually.

The lens assembly 200 may include a microdisplay viewfinder 220, which may be located on a back surface of the lens assembly 200. The microdisplay viewfinder 220 may be used by left or right eye, and over eyeglasses. The lens assembly 200 may also include a pull-out or swing-out opaque or translucent eye blocker 240 (shown in FIGS. 2(*a*) and 2(*b*)) to cover the eye not looking in the viewfinder. The eye blocker 240 may overcome the problem most people have when seeing a different image in each eye or having to close one eye. A microdisplay is typically defined as a flat-panel display technology under 1-inch in diagonal. A magnified microdisplay viewfinder 220 in a digital camera typically optically magnifies the display image but creates a virtual (as opposed to real) image that appears recessed inside the viewfinder. As a result, when a user looks into the microdisplay viewfinder 220, he sees an image that appears much larger and floating some distance from the viewer. The microdisplay viewfinder 220 may provide a user with a real time preview of the pictures to be taken and also a post view of already taken pictures. The microdisplay viewfinder 220 may also offer much higher resolution than a direct view display, may be up to 1280×1024, that is comparable to computer screens. The microdisplay viewfinder 220 may also reduce costs associated with the ergonomically designed digital camera, because the camera will be less bulky and heavy, and because the microdisplay may save battery power.

The microdisplay viewfinder 220 may display a mode menu (not shown), which may be controlled by the command control buttons 210. The mode menu may be similar to a mode menu found in other digital cameras. The mode menu comprises options and features which the user may select and makes the operation of a camera more user friendly, because a user can see what he is selecting. For example, the mode menu may allow the user to display previous pictures and delete the displayed picture by depressing the appropriate command control buttons 210. The microdisplay may also overlay information over the live or captured image, such as low light or low battery warnings and/or camera settings.

Alternatively, the ergonomically designed digital camera may use a regular optical viewfinder, which is commonly used in other cameras. In addition, the camera may use a regular direct view display, which is commonly used in other digital cameras. However, the regular direct view display takes up more space, drains more battery power, and can be harder to see in high or low ambient light levels.

The lens assembly 200 may also include a forehead rest 230, which may be located on the upper back surface of the lens assembly 200. The forehead rest 230 enables a user to lean or rest the digital camera against his forehead while looking through the microdisplay viewfinder 220 to enhance stabilization, keeping the camera from moving or sliding around. The forehead rest 230 may be padded to increase the comfort level and may contain a high friction surface to help reduce slipping.

FIG. 2(*b*) is an other back view of the camera. The telescoping and rotating device 160, which connects the hand grip 100 and the lens assembly 200, is in the extended position. As described earlier, the extended position of the telescoping and rotating device 160 enables the user's hand to stay in a comfortable and natural position while taking pictures.

The terms and descriptions used here are set forth by way of illustration only and are not meant as limitations. Those skilled in the art will recognize that numerous variations are possible within the spirit and scope of the invention as defined in the following claims.

What is claimed is:

1. An ergonomically designed digital camera, comprising:
    a hand grip capable of being comfortably held by one hand;
    one or more buttons including a shutter trigger located on a front surface of the hand
    one or more command control buttons located on a back surface of the hand grip;
    a lens assembly, comprising:
        a lens located on a front surface of the lens assembly, that is positioned above and connected to the hand grip by a telescoping and rotating device; and
        a forehead rest located on a back surface of the lens assembly; and
    a memory device, operatively connected to the lens, that stores digital images or videos.

2. The ergonomically designed digital camera of claim 1, further comprising a microdisplay viewfinder located on a back surface of the lens assembly.

3. The ergonomically designed digital camera of claim 2, wherein the microdisplay viewfinder displays a mode menu controlled by the one or more command control buttons.

4. The ergonomically designed digital camera of claim 1, further comprising pull-out or swing-out eye blocker.

5. The ergonomically designed digital camera of claim 1, further comprising an image stabilization.

6. The ergonomically designed digital camera of claim 1, further comprising a battery compartment located in the hand grip that uses one or more of the following batteries to provide power for the camera: standard AA batteries, lithium batteries, or various rechargeable batteries.

7. The ergonomically designed digital camera of claim 1, wherein the telescoping and rotating device is pivotable and/or flexible.

8. The ergonomically designed digital camera of claim 1, wherein the lens or an image array is rotatable between a portrait position and a landscape position.

9. The ergonomically designed digital camera of claim 8, wherein the rotation between the portrait position and the landscape position is achieved by depressing portrait/landscape rotate buttons.

10. The ergonomically designed digital camera of claim 1, further comprising a fill-in flash that is located on the front surface of the lens assembly.

11. The ergonomically designed digital camera of claim 1, further comprising a telescoping flash that is located on the lens assembly, wherein the telescoping flash can be raised and/or tilted for red-eye reduction or special effects.

12. The ergonomically designed digital camera of claim 1, wherein the forehead rest is padded for comfort.

13. The ergonomically designed digital camera of claim 1, wherein the forehead rest comprises an anti-slip surface.

14. The ergonomically designed digital camera of claim 1, wherein the hand grip is a joy-stick type hand grip.

15. The ergonomically designed digital camera of claim 1, wherein the one or more buttons are designed and located to be depressed by an index finger and/or other non-thumb fingers on the hand holding the hand grip.

16. The ergonomically designed digital camera of claim 1, wherein the shutter trigger is designed and located to be depressed by an index finger on the hand holding the hand grip.

17. The ergonomically designed digital camera of claim 1, wherein the one or more command control buttons are designed and located to be depressed by a thumb on the hand holding the hand grip.

18. The ergonomically designed digital camera of claim 1, wherein the one or more command control buttons include one or more of the following: zoom control, flash, delay timer, exposure offset, display previous picture(s), display next picture(s), delete last picture, delete all pictures, scrolling key, select, or portrait/landscape rotate buttons.

19. An ergonomically designed digital camera, comprising:
    a hand grip capable of being comfortably held by one hand;
    one or more buttons including a shutter trigger located on a front surface of the hand grip;
    one or more command control buttons located on a back surface of the hand grip;
    a lens assembly, comprising:
        a lens located on a front surface of the lens assembly, that is positioned above and connected to the hand grip by a telescoping and rotating device; and
        a forehead rest located on a back surface of the lens assembly;
    a memory device, operatively connected to the lens that stores digital images or videos;
    a microdisplay viewfinder located on a back surface of the lens assembly;
    a fill-in flash that is located on a front surface of the lens assembly; and
    a telescoping flash that is located on the lens assembly, wherein the telescoping flash can be raised and/or tilted for red eye reduction or special effects.

* * * * *